United States Patent [19]

Utsumi et al.

[11] Patent Number: 5,432,767
[45] Date of Patent: Jul. 11, 1995

[54] OPTICAL DISC, AN IMAGE SIGNAL TRANSMITTING APPARATUS UTILIZING THE OPTICAL DISC AND AN IMAGE SIGNAL TRANSMITTING METHOD

[75] Inventors: Kuniaki Utsumi, Hirakata; Kazuki Maeda, Sakai, both of Japan

[73] Assignee: Matsushita Electric Industrial Co., Ltd., Osaka, Japan

[21] Appl. No.: 987,660

[22] Filed: Dec. 9, 1992

[30] Foreign Application Priority Data

Dec. 12, 1991 [JP] Japan .................. 3-328721

[51] Int. Cl.$^6$ .............................................. G11B 5/09
[52] U.S. Cl. ......................................... 369/48; 369/32
[58] Field of Search ................. 369/47, 48, 54, 32; 360/15

[56] References Cited

U.S. PATENT DOCUMENTS 4,203,130  5/1980  Doumit et al. ................... 348/96
4,817,075  3/1989  Kikuchi et al. ..................... 360/15

OTHER PUBLICATIONS

Nihon Keizai Shinbun, Mar. 15, 1992 (with Partial Translation).
IEEE Global Telecommunications Congerence & Exhibitions, Conference Record vol. 1 of 3, Dec. 2-5, 1990.

Primary Examiner—Georgia Y. Epps
Assistant Examiner—P. W. Huber
Attorney, Agent, or Firm—Price, Gess & Ubell

[57] ABSTRACT

The present invention provides an optical disc comprising a main-image signal recording area holding a signal of a main image for a display, and a sub-image signal recording area holding a signal of a sub image to be displayed including an image of a time counted down in accordance with a progress of a sub-image signal reproduction. Furthermore it provides an image signal transmitting apparatus for repeatedly transmitting a main-image signal and a sub-image signal one after the other by utilizing such optical disc, the image signal transmitting apparatus comprising a image signal reproduction device for reproducing the main-image signal and the sub-image signal, a cycle time memory for memorizing a main-image signal transmission cycle, and a control device for obtaining a time difference between the cycle and time required for the main-image signal reproduction as well as control the image signal reproduction device.

1 Claim, 7 Drawing Sheets

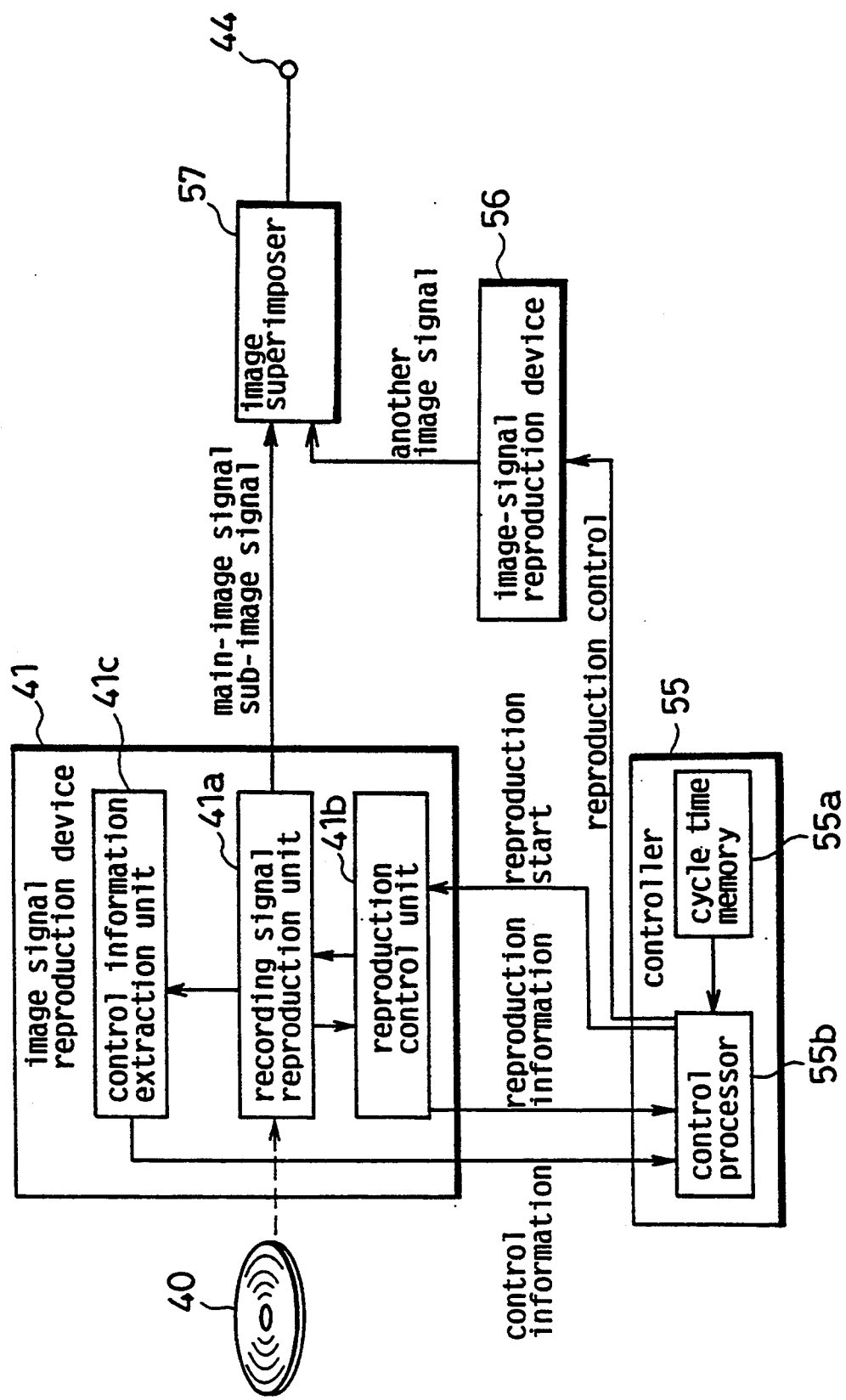

OPTICAL DISC, AN IMAGE SIGNAL TRANSMITTING APPARATUS UTILIZING THE OPTICAL DISC AND AN IMAGE SIGNAL TRANSMITTING METHOD

BACKGROUND OF THE INVENTION

1. Field of the Invention

The present invention relates to an optical disc holding an image signal, an image signal transmitting apparatus utilizing such optical disc and an image signal transmitting method, which are mainly applied to a broadcasting system including a cable television service (CATV) for broadcasting repeatedly an image at a certain cycle, 2. Description of the Related Art Recently a service for broadcasting repeatedly a single program at a fixed cycle has been provided so that viewers can watch the program whenever they want. The cycle is usually fixed to be longer than the time required for a reproduction of the program to be broadcasted, therefore no image or a still picture showing a start time of the next reproduction of the program appears at an interval between reproductions of the program.

In order to broadcast the program and the still picture one after the other an apparatus is constructed as shown in FIG. 1. Such device is equipped with an image signal reproduction device 11 for reproducing a signal of the program, a still picture signal generation device 12 for generating a signal of the still picture to display the start time of the program, a selector 13 for selecting either the program signal or the still picture signal to be outputted to an output terminal 14, and a controller 15 for controlling the devices 11 through 14.

A control by the controller 15 is operated as described hereunder. When the program is being reproduced, the controller 15 controls the image signal reproduction device 11 and the selector 13 so that the image signal reproduction device 11 reproduces the program signal while it is selected by the selector 13 to be outputted to the output terminal 14. When the reproduction of the program is completed, the controller 15 controls the still picture signal generation device 12 and the selector 13 so that the still picture signal generation device 12 generates the still picture signal while it is selected by the selector 13 to be outputted to the output terminal 14. Such control is repeated at a fixed cycle so that the program is provided at the fixed cycle.

However, the information provided by the above apparatus is simply what viewers get from a program schedule table despite that the above apparatus requires additional devices such as the still picture signal generation device 12, the selector 13, and the controller 15.

In order to broadcast an image more useful than the still picture, another apparatus is conceivable. As shown in FIG. 2 the apparatus is equipped with a time display image signal generation device 22 instead of the still picture signal generation device 12, for generating a signal of an image to display a waiting time for next reproduction of the program.

Further, another apparatus is conceivable. As shown in FIG. 3 the apparatus is equipped with another image signal reproduction device 36 and an image superimposer 37. The reproducing device 36 and the image superimposer 37 are operated so that image superimposer 37 superimposes the waiting-time display on a background image, including a commercial image, reproduced by the image signal reproduction device 36.

The apparatuses in FIG. 2 and 3 have an advantage of informing the viewers of the waiting time for the next reproduction of the program; furthermore, the latter apparatus has another advantage of providing various information by superimposing the waiting-time display on another image. However, the complicated construction of the apparatus in FIG. 1, which is the drawback thereof, still remains in the apparatuses in FIG. 2 and 3.

SUMMERY OF THE INVENTION

It is a primary object of the present invention to provide the optical disc holding the signal of the program, which enables a simply constructed image signal transmitting apparatus to transmit the program in a repeated manner having the fixed interval as well as transmit the image displaying the waiting time for the next reproduction of the program. Hereunder the program to be provided is referred to as a main image, relevant for a series of images composing the program.

The above object is fulfilled by an optical disc comprising a main-image signal recording area holding a signal of the main image for a display, and a sub-image signal recording area holding a signal of a sub image to be displayed including an image of a time counted down in accordance with a progress of a sub-image signal reproduction.

The optical disc holding the above information makes it possible to transmit the sub image which displays the waiting time until the next reproduction of the main image, simply by reproducing the sub-image signal recorded at the fixed place in the sub-image signal recording area. Hence, the image signal transmitting apparatus which utilizes such an optical disc has an advantage of excluding a generation device for generating the sub-image signal and a control device for controlling the generation device, and another advantage of transmitting main-image signals of various reproduction times and transmission cycles.

The main-image signal recording area may be placed immediately after the sub-image signal recording area in a reproduction direction, or the sub-image signal recording area may be placed after the main-image signal recording area in such direction. In the former case, the reproduction is as simple as reproducing signals recorded between the fixed point in the sub-image signal recording area and the end point of the main-image recording area. In the latter case, the optical disc is compatible with a general optical disc since a reproduction of the optical disc starts with the main image reproduction even when it is conducted by a general reproduction apparatus.

It is another object of the invention to provide the image signal transmitting apparatus for transmitting the image by utilizing such an optical disc, and the image signal transmitting method.

The above object is fulfilled by an apparatus equipped with a control device for controlling the image signal reproduction device so that the sub-image signal and the main-image signal are reproduced one after the other, the sub-image signal being recorded between the point where the sub-image signal is recorded to display a time difference between a main-image signal transmission cycle and time required for the main-image signal reproduction and an end point of the sub-image signal recording area while the main-image signal being recorded in the main-image signal recording area.

It is also fulfilled by reproducing, one after the other, the sub-image signal and the main-image signal when the completion of the main-image signal reproduction is detected, the sub-image signal and the main-image signal being placed between the point where the sub-image signal is recorded in the sub-image signal recording area to display the time difference between the main-image signal transmission cycle and the time required for the main-image signal reproduction and an end point of the main-image signal recording area.

It is also fulfilled by reproducing the main-image signal when the completion of the sub-image signal reproduction is detected while reproducing the sub-image signal when the completion of the main-image signal reproduction is detected, the sub-image signal being placed between the point where the sub-image signal is recorded to display the time difference between the main-image signal transmission cycle and the time required for the main-image signal reproduction and the end point of the sub-image signal recording area.

The image signal transmitting apparatus, which is operated as the above, reproduces the main-image signal at the fixed cycle as well as reproduces the sub-image signal to display the waiting time for next reproduction of the main-image signal at the interval between reproductions of the main-image signal.

Also the sub image may be superimposed on another image. A signal of such image is recorded outside the optical disc and is reproduced for the background of the sub image.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 8 is a block diagram showing the image signal transmitting apparatus in Embodiment 3 of the present invention.

DESCRIPTION OF THE PREFERRED EMBODIMENTS

Embodiment 1

Figure 1:
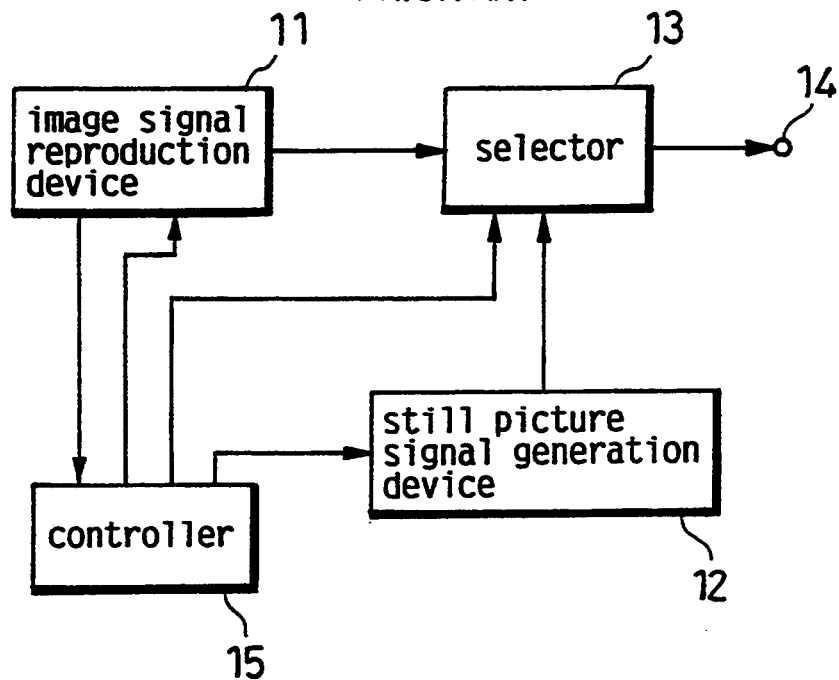
FIG. 1 is a block diagram showing a conventional apparatus for broadcasting the main image and the still picture one after the other.
Figure 2:
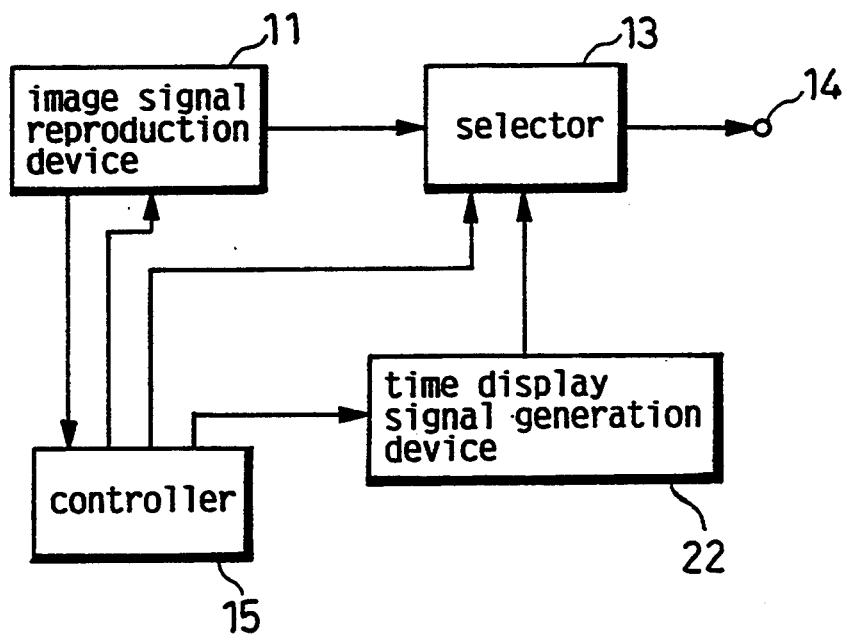
FIG. 2 is a block diagram showing an apparatus designed to broadcast a more useful image at the interval.
Figure 3:
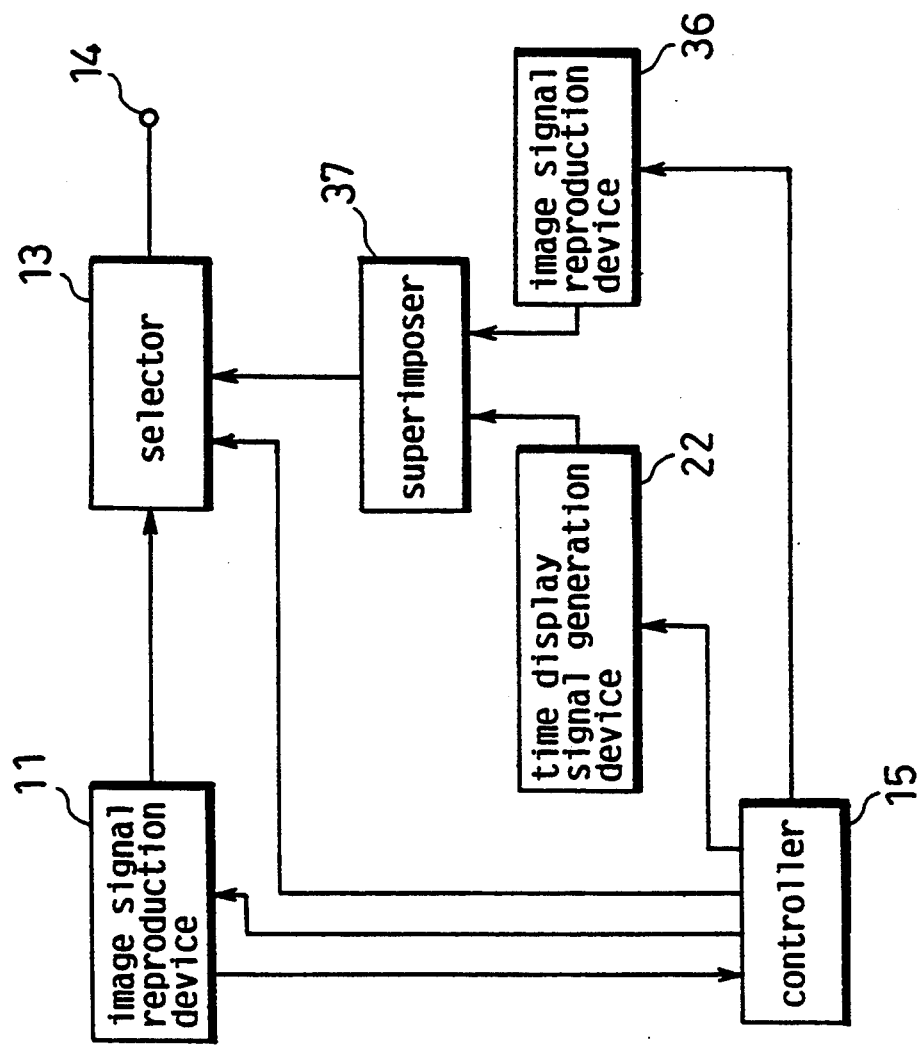
FIG. 3 is a block diagram showing another apparatus designed to broadcast a more useful image at the interval.
Figure 4:
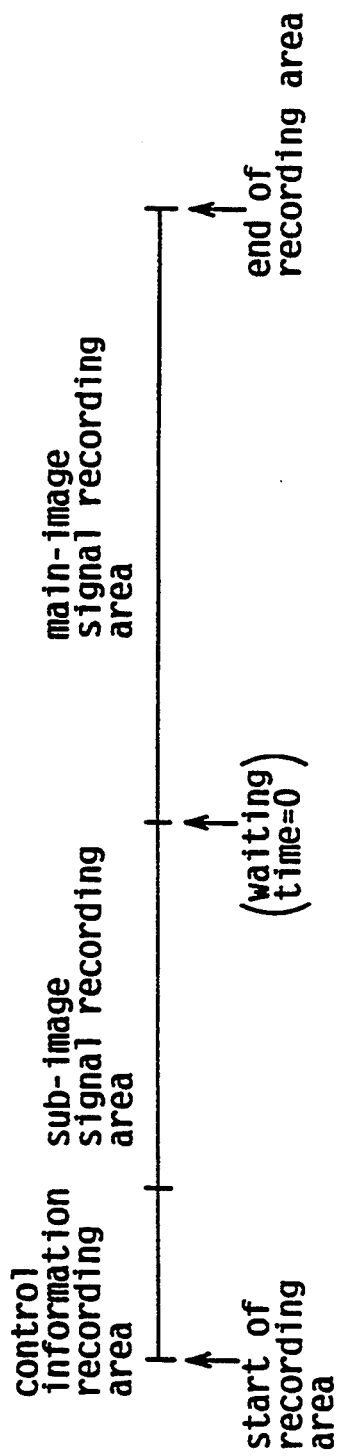
FIG. 4 is an illustration showing a recording format of the optical disc in Embodiment 1 of the present invention.

An optical disc in this embodiment is described hereunder referring to FIG. 4. As shown in the figure the optical disc has a control information area, a sub-image signal recording area, and a main-image signal recording area. The main-image signal recording area holds a signal of a main image to be provided, that is a signal of a program including a series of images. The sub-image signal recording area holds a signal of a sub image which displays a time counted down to be 0. The main-image signal recording area is placed immediately after the sub-image signal recording area. The optical disc constructed as above is utilized by an image transmitting apparatus so that the main-image signal and the sub-image signal are reproduced one after the other. To be concrete, the sub-image signal is reproduced to display the waiting time for the next reproduction of the main image signal, and the main image signal reproduction starts when the time O is displayed. Additionally, the sub image is an optional image (e.g., a message saying "continued until next reproduction of the image starts", or a commercial image) with the waiting-time display superimposed thereon. The control information area holds control information including addresses each of which shows a start and an end point of the main-image signal recording area, time required for a reproduction of the main image, and addresses each of which corresponds to each point of the time counted down.

Figure 5:
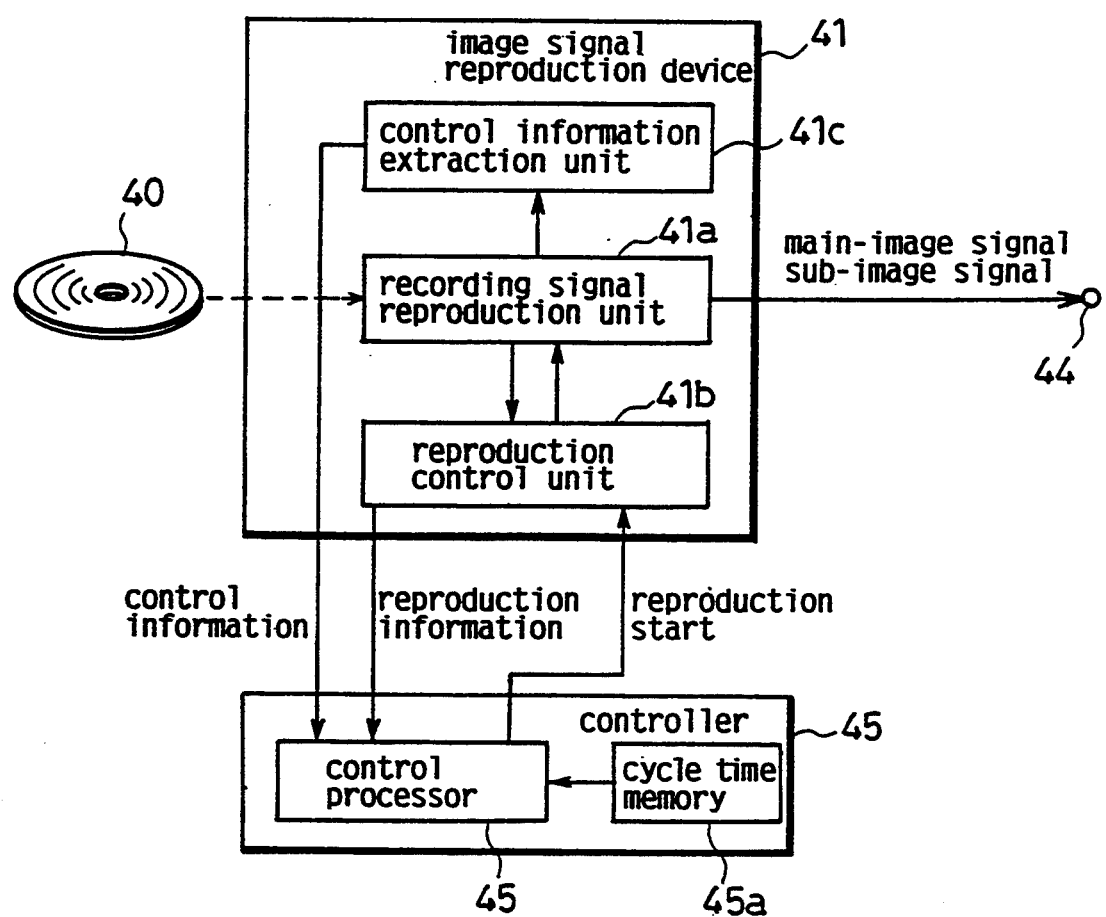
FIG. 5 is a block diagram showing the image signal transmitting apparatus utilizing said optical disc.

The optical disc constructed as above is utilized by the image signal transmitting apparatus constructed as shown in FIG. 5. That is, the transmitting apparatus for transmitting the main-image signal at the fixed cycle by utilizing the above optical disc is equipped with an image signal reproduction device 41 for outputting the image signal to be transmitted to an output terminal 44, and a control device 45 for controlling the image signal reproduction device 41. Further, the image signal reproduction device 41 has a recording signal reproduction unit 41a for reproducing the signal recorded in the optical disc 40, a reproduction control unit 41b for controlling the recording signal reproduction unit 41a and the like, and a control information extraction unit 41c for extracting the control information from a reproduction signal. The controller 45 further has a cycle time memory 45a for memorizing the cycle at which the main-image signal and the sub-image signal are transmitted, and a control processor 45b for outputting a control signal to control the image signal reproduction device 41.

Figure 6:
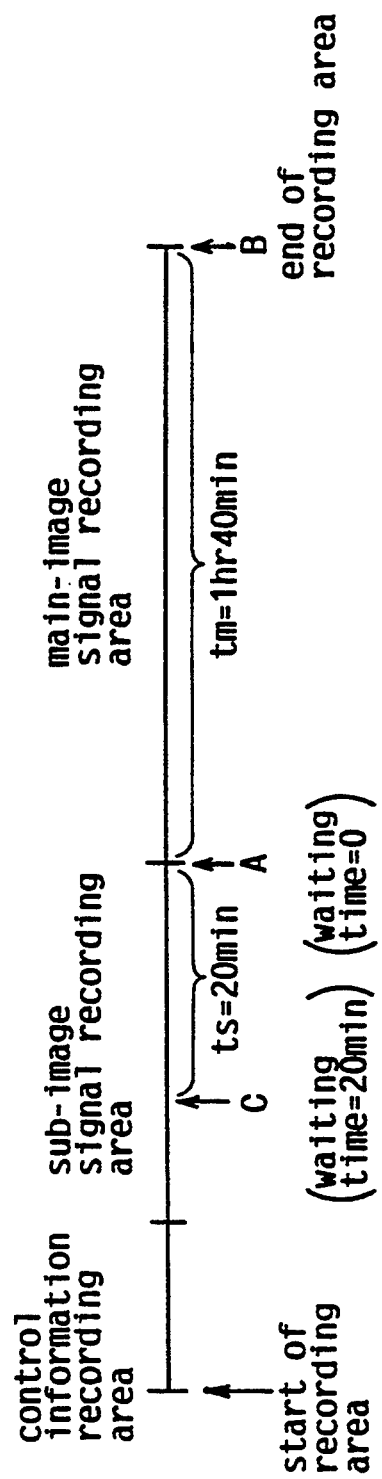
FIG. 6 is an illustration showing a concrete recording format of said optical disc.

An operation of the transmitting apparatus is described hereunder with referring to FIG. 6. In this case the apparatus transmits the main-image signal at a two-hour cycle by utilizing an optical disc 40 holding the sub-image signal of a 30 minute reproduction and the main-image signal of a 100 minute reproduction and also addresses A and B for the start and the end point of the main-image reproduction respectively.

The cycle ($tc = 2$ hours) is memorized by the cycle time memory 45a of the control device 45 beforehand. When the optical disc 40 is set to the image signal reproduction device 41, the recording signal reproduction unit 41a reproduces the signal recorded in the control information area, and the control information extraction unit 41c extracts therefrom the control information including the time required for the main-image signal reproduction ($tm = 1_{hr} = 40_{min}$) as well as the addresses each of which corresponds to each point of the time counted down, then transmits the extracted information to the control processor 45b.

The control processor 45b subtracts the time required for the main image signal reproduction (tm) from the cycle (tc) to obtain the time required for the sub-image signal reproduction (ts=20 min), then obtains the address C which is placed ahead of the main-image signal recording area by 20 minutes to show the start point of the waiting-time display, and holds it. The control processor 45b directs the reproduction control unit 41b to reproduce the main-image signal.

According to the direction given thereto, the reproduction control unit 41b controls the recording signal reproduction unit 41a for the main-image signal reproduction. Informed with a completion of the reproduction, the control processor 45b directs the reproduction control unit 41b to control the recording signal reproduction unit 41a so that the sub-image signal reproduction starts with the address C.

Immediately after completing the sub-image signal reproduction which displays the waiting time counted down from 20 min to 0 min, the recording signal reproduction unit 41a reproduces the main-image signal. Hereinafter the control processor 45b repeats its control on the image signal reproduction device 41 so that a cycle is repeated, wherein the sub-image signal reproduction starting with the address C and the main-image signal reproduction take place one after the other.

Embodiment 2

Figure 7:
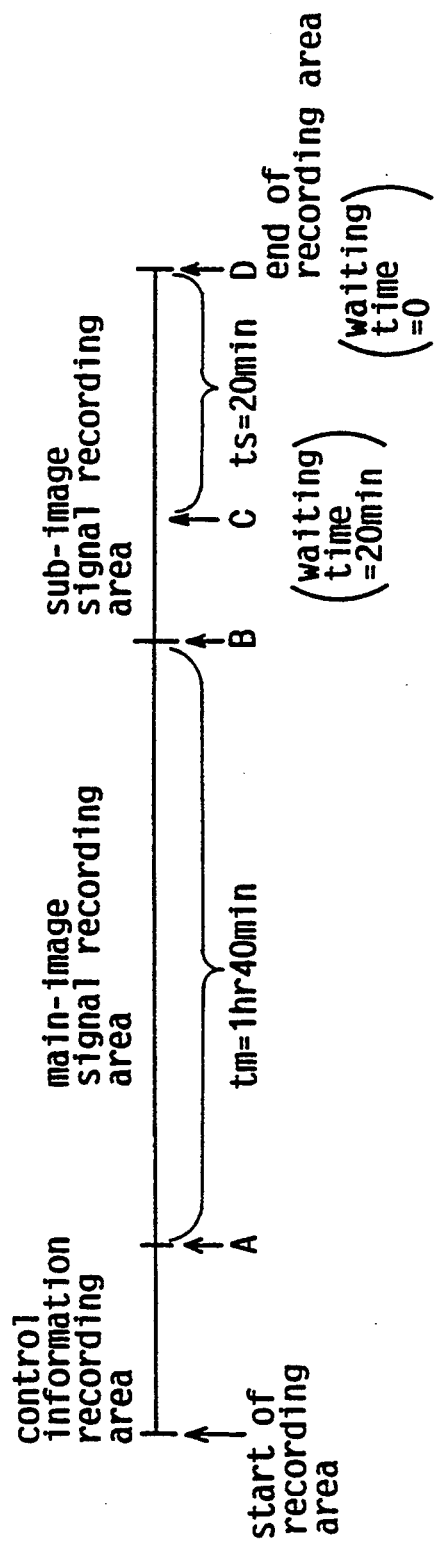
FIG. 7 is an illustration showing a concrete recording format of an optical disc in Embodiment 2 of the present invention.

An optical disc in this embodiment is described hereunder referring to FIG. 7. As shown in the figure the optical disc holds the same signals in Embodiment 1 except that a main-image signal recording area and the sub-image signal recording area are opposite in their placements; first is the main-image signal recording area, and the control information area further holds addresses showing a start and an end point of the sub-image signal recording area. The transmitting device for transmitting image signals by utilizing such an optical disc is equipped with the reproducing control unit 41b and the control processor 45b is driven differently from Embodiment 1. That is, informed by the reproduction control unit 41b that the image signal recorded at the address D in the recording area is transmitted to display the time O, the control processor 45b directs the reproduction control unit 41b to reproduce the main-image signal, starting with the address A. The procedure following the main-image signal reproduction is substantially same as Embodiment 1.

Besides controlling a start of the sub-image signal reproduction, as in Embodiment 1, the reproduction control unit 41b in this embodiment is also responsible for controlling a main image signal reproduction. The optical disc, however, has an advantage that enables even a general reproduction device to start its operation with the main image reproduction.

Embodiment 3

Another image signal transmitting apparatus for transmitting image signals by utilizing the optical discs in Embodiments 1 and 2 is described hereunder with referring to FIG. 8. Such apparatus transmits the sub image with another optional image superimposed thereon. This is achieved by restricting the sub image in the optical disc to an image which can be superimposed on another image. For example, the time image is used preferably as the sub image. Like components are labeled with like reference numerals with respect to the first and the second embodiments, and the description of these components is not repeated.

As shown in the figure, the transmitting apparatus is equipped with an image signal reproduction device 56 and an image superimposer 57 besides the image signal reproduction device 41 and the control unit 55.

The image signal reproduction device 56 such as a video tape player or an optical disc reproduction device represented by the image signal reproduction device 41, outputs the image signal to be transmitted at the interval between reproductions of the main image, including a background video, an advertisement for the main image, a commercial image or the like.

The image superimposer 57 superimposes the image reproduced by the image signal reproduction unit 41 on the image reproduced by the image signal reproduction device 56.

The control device 55 controls the image signal reproduction device 41 and the image signal reproduction device 56. More specifically, the controller 55 controls the image signal reproduction device 56 to output the image signal only when the image signal reproduction device 41 reproduces the sub-image signal to be outputted.

The transmitting apparatus described above can superimpose the sub image on another image; therefore its use increases the general applicability of the optical disc.

Further, a recording medium, which should be an optical disc with a large memory capacity and a high durability, may vary in its recording type including a recording by detecting a presence/an absence of a pit or recording by detecting a magnetizing direction or an alternation in phase.

Also the time required for the main-image signal reproduction may be obtained by converting a difference between the start and the end point of a main-image signal recording area from an address into time.

Further, in the above embodiments the reproduction control unit 41b and the control processor 45b/ 55b function separately from each other, but both can be integrated into a micro computer equipped with a CPU or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A video image transmitting apparatus for broadcasting a main video signal having a predetermined duration and a sub-image signal for informing a viewer of a time period in which the main video image signals will be rebroadcast, comprising:
  an optical disc having stored thereon, in series, a control information, including addresses, each setting forth the start and end point of the main-image signal, a time required for reproduction of the main image, and addresses, each corresponding to time count down images, one of a sub-image recording signal and a main video image recording signal the other of a sub-image recording signal and a main video image recording signal, and an end of recording signal;
  a recording signal reproduction unit for reading the information stored on the optical disc;
  a control information extraction means for receiving the control information;

a control processor for responding to the control information extraction means to broadcast the main video image signal and subsequently the sub-image signal; and means for providing a superimposed time image integrated with the sub-image signal that broadcasts a waiting time indication until the subsequent reproduction of the main video image signal.

* * * * *